United States Patent Office 3,345,517
Patented Oct. 3, 1967

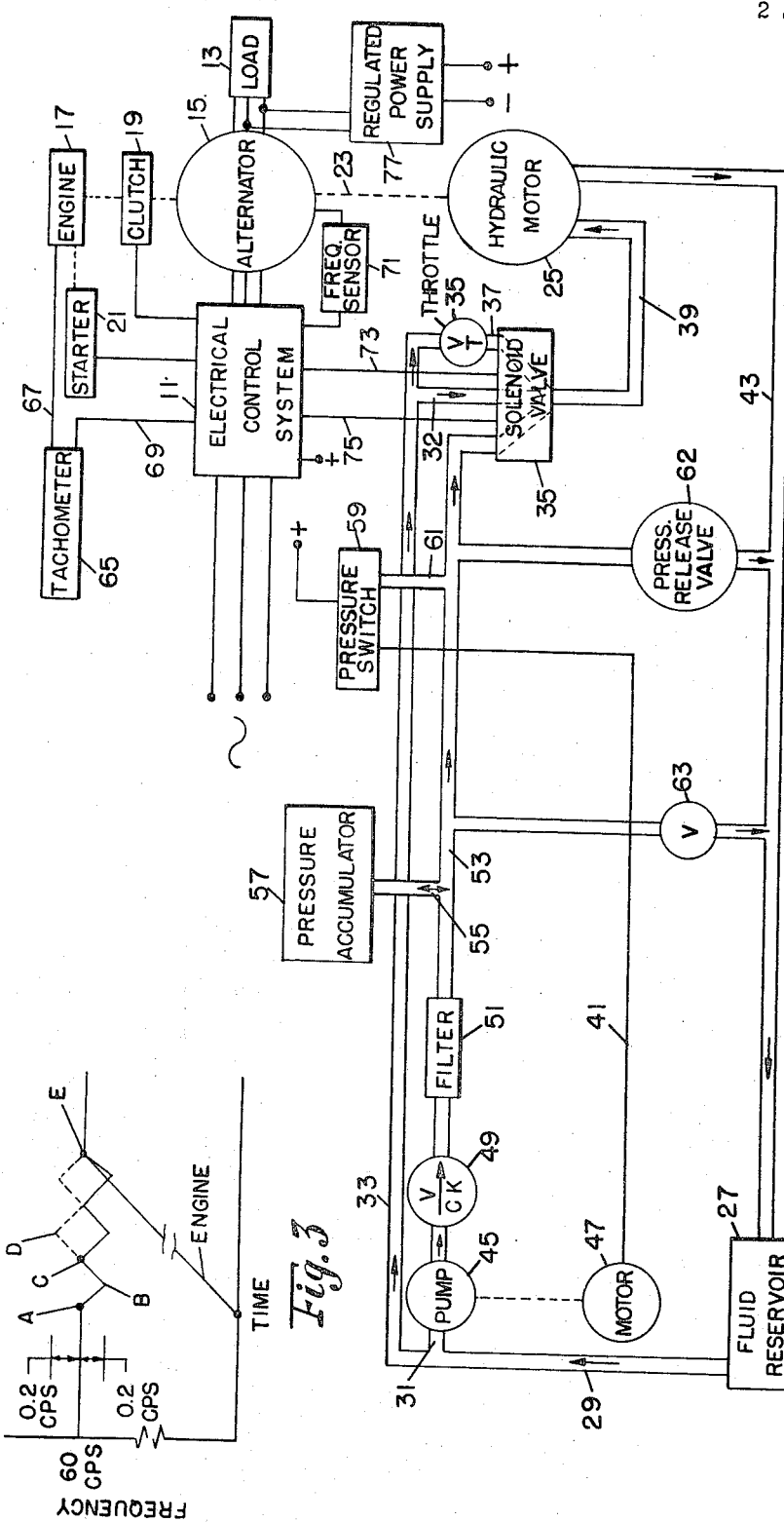

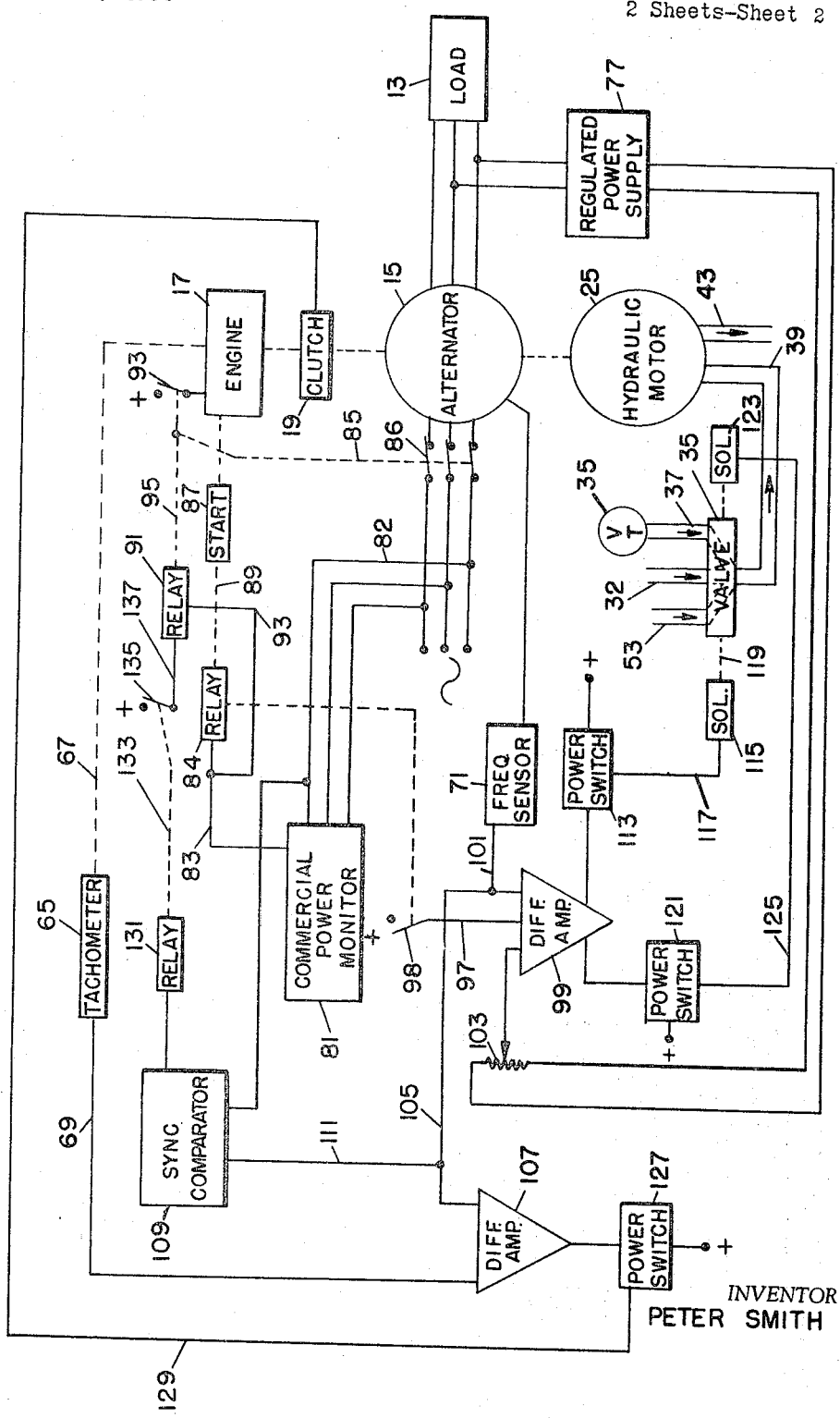

3,345,517
UNINTERRUPTED POWER SUPPLY
Peter Smith, Hawthorn, N.J., assignor to Dynamics Corporation of America, New York, N.Y., a corporation of New York
Filed Feb. 14, 1964, Ser. No. 344,979
6 Claims. (Cl. 290—4)

This invention relates generally to a standby power system and more particularly to a standby power system which utilizes an auxiliary hydraulic energy system.

A disclosure of the basic concept of using hydraulic power in a standby power system is disclosed in copending patent application Ser. No. 303,894 filed Aug. 22, 1963, in the name of Alexander Bloch and assigned to the assignees of the present invention. The Bloch disclosure, now U.S. Patent No. 3,283,165, contains a discussion of the normal standby units used today, particularly the systems which use a flywheel for stored mechanical energy in order to prevent the complete interruption of the power supply when the transfer from normal power to standby power occurs.

Although the use of the flywheel has, in effect, eliminated a complete outage during transfer, it creates undesirable fluctuations in line frequency and voltage. Such fluctuations are particularly disadvantageous when a load of a critical nature is being supplied during the changeover.

The basic hydraulic system utilizes a hydraulic motor which may be connected to a pressure accumulator when an objectionable fluctuation of the normal power supply occurs. This hydraulic motor is connected to an alternator or to a motor generator set which may be operated by a standby engine during power failures. The hydraulic motor maintains a stable output from the alternator during the short period of time required for the standby engine to attain the proper speed for operating the alternator. A more detailed discussion of the desirable characteristics of the hydraulic system as opposed to the flywheel inertia system may be found in the above-identified application.

One of the problems which arises in the operation of the Bloch system is the method of controlling the speed of the hydraulic motor. In that system such speed is controlled hydraulically by a flow control valve between the hydraulic motor and the pressure accumulator. Due to the extreme hydraulic pressures used, it is difficult to provide a valve which is able to accurately control the frequency of rotation of the hydraulic motor and at the same time withstand the tremendous pressure surges to which it is subjected. Therefore, when a very rugged valve is provided in the system, the variations in frequency, although superior to the operating characteristics of the inertial flywheel, may often still be beyond the acceptable limits of the particular critical load.

Accordingly, it is an object of this invention to provide an auxiliary power system for temporarily supplying electrical power to a load upon unstable operation of the normal power supply.

It is a further object of this invention to provide an auxiliary power system wherein the control of the operation of the hydraulic system is effected by means of electrical parameters rather than by the hydraulic system itself.

It is a further object of this invention to provide an instantaneous transfer of power to a standby unit with an insignificant change in frequency and voltage during such changeover.

Yet another object of this invention is to provide an emergency standby system having electrical control of the clutch between the standby engine and the alternator which insures engagement of the clutch only when the frequency rotation of the engine is the same as the frequency of rotation of the alternator.

These and other objects will become apparent from the following description when taken in conjunction with the drawings wherein:

FIG. 1 is a schematic of the basic hydraulic system used in the present invention;

FIG. 2 is a schematic of the electrical control system used in conjunction with the hydraulic system of FIG. 1; and FIG. 3 is a graphical representation of the operation of the system as related to the output of the alternator.

Turning now more specifically to the drawings, FIG. 1 shows a standard commercial power supply passing into an electrical control system 11 to an alternator 15 which supplies the ultimate load 13. It should be pointed out that although the description of the invention specifically shows the use of an alternator it is equally applicable to the use of a standard motor-generator set.

A standby engine 17, which may be either gasoline or diesel, is mechanically coupled to the alternator 15 by means of clutch 19. For the particular control system described hereafter it is preferable to use an induction type clutch because of the ease of controlling it by means of the available electrical parameters.

A starter 21 is coupled to engine 17 and controlled by the electrical control system as will be apparent as the description proceeds.

An electrical tachometer 65 is also coupled between standby engine 17 and the electrical control system 11. Additionally, a frequency sensor 71 is coupled to the alternator 15 and feeds a continuous output signal to the electrical control system. A regulated power supply, having its input taken between the alternator and the load, is provided in order to supply a stable output voltage for use in the system regardless of fluctuations which might occur in the output of the alternator. This entire electrical system will be explained in detail in connection with FIG. 2.

A conduit 29 connects fluid reservoir 27 to a pump 45 by means of conduit 31. Pump 45 is driven by electrical motor 47 and supplies fluid under pressure through a check valve 49, filter 51 and conduit 55 to the pressure accumulator 57. A pressure switch 59 may be connected to the pressure accumulator by means of conduits 53 and 61 in order to deenergize motor 47 when the pressure within the accumulator has reached a predetermined value.

A solenoid valve 35 has three alternate inputs. Conduit 53 connects the valve to the pressure accumulator 57, and conduits 32 and 37 connect the valve to the fluid reservoir 27. Conduit 37 has a throttle valve 35 connected between the solenoid valve and the fluid reservoir for purposes which will be explained as the description proceeds. The output of the solenoid valve 35 is connected to the input of a hydraulic motor 25 by means of conduit 39. The output of the hydraulic motor is, in turn, connected to the fluid reservoir 27 by means of conduit 43.

When solenoid valve 35 is in its non-actuated position, the input thereto from reservoir 27 is supplied by means of conduits 29, 33 and 32. The hydraulic motor is being idled by means of the coupling 23 from the alternator so that the hydraulic fluid is continually circulated from the fluid reservoir to the hydraulic motor and back to the fluid reservoir.

When the electrical control system senses a failure in the line power or an extreme variation thereof, the solenoid valve is actuated so as to connect conduit 53 to the input of a solenoid valve 35. This, in turn, connects the pressure accumulator 57 to the input of the hydraulic motor, thus driving the hydraulic motor so as to maintain rotation of the alternator.

If the hydraulic motor attains a frequency of rotation greater than that desired, the frequency sensor 71 supplies a signal to the electrical control system which moves the solenoid valve so as to have an input thereto from line 33, through throttle valve 35 and conduit 37. This causes the hydraulic motor to pull against a pressure created by the throttle valve, slowing down the rotation of the motor.

For safety purposes the usual pressure relief valve 62 and the manually operated relief valve 63 are supplied between the high pressure line 53 and the return line 43.

Turning now to FIG. 2, the electrical system is shown with the various switches in a position wherein the alternator is being supplied from a normal power source and supplying power to the load 13. Although the commercial power monitor may be of any type voltage monitoring equipment, it is preferred that it be of a type which monitors the amplitude, phase and frequency of the commercial power in order to detect fluctuation in any of these possible variables. The commercial power is connected to the power monitor by means of leads 82. Upon detection of unstable conditions in the commercial power supply, the monitor 81 activates relay 84 by means of lead 83. Relay 84 initiates operation of starter 87 by means of coupling 89 and simultaneously closes the switch 98 which, in the particular instance illustrated here, supplies the B+ power to the differential amplifier 99 by means of lead 97. Relay 91 is simultaneously operated with relay 84 so as to operate engine 17. In FIG. 2 the engine 17 is shown as an internal combustion engine with relay 91 closing switch 93 by means of coupling 95 so as to supply the necessary power to the engine. If a diesel engine is used, relay 91 would control the fuel supply to the engine. Relay 91 also opens main switch 86, thus removing the commercial power supply from the alternator 15.

As is well known, a definite period of time is required for the engine 17 to attain the proper speed before it can be engaged to alternator 15 for operation thereof. When a critical load is involved such a time delay is not within the tolerable operating limits of the load. The present system is designed to maintain the rotation of the alternator constant during this changeover period.

As an example, assume that there is a total failure of the commercial power supply. Almost immediately the frequency of rotation of the alternator 15 and, therefore, the frequency thereof would begin to decrease. This fluctuation is detected by frequency sensor 71 which in turn supplies an input to the differential amplifier 99 by means of lead 101. The other input to the differential amplifier is supplied by means of rheostat 103 which is connected to the regulated power supply 77. The rheostat is adjusted to the proper level and as long as there is no difference between the inputs from the frequency sensor and the rheostat then there is no output from the differential amplifier 99. However, when the output from the frequency sensor decreases because of a decrease in the frequency of rotation of the alternator 15, there is an output from the differential amplifier which actuates the power switch 113 energizing solenoid 115 by means of lead 117. Actuation of solenoid 115 shifts the valve 35 by means of coupling 119 so as to connect the input to conduit 53. Since conduit 53 is connected to the pressure accumulator, the fluid pressure is transferred to the hydraulic motor by means of conduit 39 and returned to the fluid reservoir by means of conduit 43.

If the alternator 15 exceeds the desired frequency of rotation as a result of the drive from the hydraulic motor 25, frequency sensor 71 will have an output which is greater than the voltage delivered to the differential amplifier from the rheostat 103. This will result in an output from the differential amplifier to the power switch 121 to actuate solenoid 123 by means of lead 125 and shift valve 35 to the position wherein the input thereto is from conduit 37 and throttle valve 35. Since the hydraulic motor then must pull fluid through the throttle valve, an effective dampening of the hydraulic motor is provided tending to slow it down to a degree dependent upon the setting of the throttle valve. This system as described provides a means for maintaining a very stable operation of the alternator 15.

In order to insure engagement of the engine 17 to the alternator 15 only at a time when the frequency of rotation of both elements is identical, there is provided an electrical system for comparing the frequency of rotation of both the engine and the alternator. In this system the output of frequency sensor 71 is connected to the input of a further differential amplifier 107 by means of lead 105. The second input to differential amplifier 107 is provided from an electrical tachometer 65 by means of lead 69. The electrical tachometer is coupled to the engine by means of lead 67 in a well-known manner. It is preferable to use an induction type clutch 19 in the present system due to the fact that very close control may be maintained over such a clutch. The differential amplifier 107 is connected in a manner such that as long as there is a difference between the output of the frequency sensor and the output of the tachometer 65, there is no output from the amplifier 107. However, when these two outputs are equal the differential amplifier 107 provides an output to power switch 127, which in turn supplies power to the induction clutch 19 by means of lead 129, thus engaging the engine 17 to the alternator 15. At this point of operation, the standby unit is supplying the necessary driving power for the alternator which supplies the load. Since a critical load is involved, it is also important that the standby system be retained in operation until the commercial power matches the output of the alternator so that there will be no sudden fluctuation of the input to the critical load. For this purpose, a synchronous comparator 109 is used having inputs from the frequency sensor 71 through lead 111 and from the commercial power supply lines 82. As long as there is a variation in the output of the frequency sensor and the commercial power supply, the synchronous comparator 109 actuates relay 131 which closes switch 135 by means of coupling 133. Switch 135 maintains the power supply to relay 91 by means of lead 137. Therefore, even if the commercal supply appears to be stable and acceptable to the commercial power monitor, the main switch 86 will remain open if the synchronous comparator detects a variation. Accordingly, a stable power supply to the critical load is assured not only at the time of switchover to the standby unit but at such time as there is a return to the normal power supply.

Turning now to FIG. 3, there is depicted a graphical representation, greatly exaggerated, showing the operation of the system as discussed above. A stable frequency output from the alternator exists until point A is reached, which represents a power failure or a fluctuation of power beyond tolerable limits. Such a failure results in the opening of the main switch 86 and a resultant decrease in the frequency of rotation of the alternator 15. When the frequency decreases to point B, the output of differential amplifier actuates solenoid 115 and connects the valve 35 to the pressure accumulator. The hydraulic motor 25 then immediately takes over the drive of the alternator, bringing the frequency back up to point C which is the desirable operating frequency. As illustrated, the engine 17 is also started at the point of time A and its frequency of rotation commences to build up to the proper operating speed.

When the alternator is supplying a sufficiently heavy load, this load in itself acts somewhat as a break to prevent an overshoot in the frequency of the alternator. Under these conditions, the hydraulic motor will be alternately connected to the accumulator and follow the fluctuation depicted by the solid black line of the graph until point E is reached, at which time the engine has reached the proper speed for connection to the alternator.

Under very light load or no load conditions, the alternator will tend to increase in speed beyond the desired frequency as illustrated by the dotted lines. The frequency increases up to a point D at which time the output of the frequency sensor is sufficient to cause an output from the differential amplifier 99 which, in turn, operates switch 121 and solenoid 123 to shift the input of the valve 35 to conduit 37 and throttle valve 35. The increased resistance through the throttle valve creates a load on the hydraulic motor tending to reduce its frequency of rotation and that of alternator 15. This operation continues as shown by dotted lines in combination with the solid line operation until point E is reached.

The operation described above has been proven highly successful in controlling the power supply to the load within limits which are superior to the average commercial power supply. As indicated on the graph, I am able to maintain the frequency variation to within 0.2 c.p.s. of the desired operating frequency. Systems using the inertial flywheel discussed above are unable to maintain the frequency stable to any degree closely approaching this system due to the inherent operation of an inertial system. Additionally, due to the difficulties encountered with the use of the flow control valve disclosed in the above identified copending application, such close control of frequency variation is not possible with that system even though it is an improvement over the inertial system. Since a large number of electrical systems in use today require close tolerances due to the criticality of the load, failure to maintain a stable power supply could have the same results as a total power failure.

Although an entire standby unit is shown and described, the auxiliary hydraulic system and controls of the present invention are easily adaptable to existing standby units wherein it is desirable to avoid any variation in voltage and/or frequency beyond acceptable limits. Additionally, it is obvious in view of the above disclosure that many of the components illustrated and described herein may be replaced by equivalent components.

I claim:

1. An auxiliary power system for temporarily supplying electrical current to a load upon unstable operation of the normal power supply source comprising,
    an alternator,
    a hydraulic fluid reservoir,
    a hydraulic pressure accumulator,
    pump means connected between said reservoir and said accumulator for creating a fluid pressure in said accumulator,
    a hydraulic motor, means for coupling said motor to said alternator,
    a three-way solenoid operated valve,
    an output conduit connecting the output of said valve to the input side of said hydraulic motor,
    a return conduit connected between the output of said hydraulic motor and said reservoir,
    first and second input conduits connecting said solenoid valve to said reservoir,
    an adjustable throttle valve in said second input conduit,
    a third input conduit connecting said pressure accumulator to said solenoid valve,
    sensing means coupled to said alternator for detecting a variation in the frequency of said alternator from a predetermined standard,
    means coupled to said sensing means for activating said solenoid valve in response to frequency variations of said alternator,
    said valve interconnecting said first input conduit with said output conduit when in an inactivated condition,
    said valve interconnecting said output conduit with said third conduit in response to a drop in the frequency output of said alternator and interconnecting said output conduit with said second conduit in response to a rise in the frequency output of said alternator.

2. The system of claim 1 wherein said means coupled to said sensing means comprises a differential amplifier for comparing the output of said sensing means with a fixed reference voltage, said amplifier having dual outputs, and dual solenoids for operating said valve, one solenoid being connected to each of said amplifier outputs.

3. An auxiliary power system for temporarily supplying electrical current to a load upon unstable conditions in the normal power supply comprising,
    an alternator,
    a hydraulic motor coupled to said alternator,
    a hydraulic reservoir,
    a pressure accumulator,
    pump means connected between said reservoir and said accumulator for creating fluid pressure within said accumulator,
    means connecting the output of said motor with said reservoir,
    a solenoid valve for alternately interconnecting said reservoir and said accumulator to the input of said hydraulic motor,
    and means coupled between said alternator and said valve for actuating said valve in response to a variation in the frequency of rotation of said alternator from a predetermined standard, said valve interconnecting said reservoir with the input of said motor when in an inactuated position.

4. The apparatus of claim 3 wherein said means coupled between said alternator and said valve comprises,
    a frequency sensor coupled to said alternator having a voltage output proportional to the frequency of rotation of said alternator,
    a differential amplifier coupled to said frequency sensor for comparing the voltage output of said sensor with a fixed voltage reference, the output of said amplifier being coupled to said solenoid valve.

5. An auxiliary power system for temporarily supplying electrical power to a load upon unstable conditions in the normal power supply comprising,
    an alternator,
    a hydraulic motor coupled to said alternator,
    a frequency sensor coupled to said alternator having a voltage output proportional to the frequency of rotation of said alternator,
    an accumulator for storing hydraulic fluid under pressure,
    a solenoid actuated valve connected between said accumulator and said hydraulic motor,
    a differential amplifier coupled to said frequency sensor for comparing the output thereof with a fixed reference voltage,
    and electrical circuit means connecting the output of said amplifier to said valve for actuation thereof, said valve being opened when the output of said sensor varies from said reference voltage beyond a predetermined amount.

6. The system of claim 5 further comprising, a fluid reservoir, and conduit means connecting said hydraulic motor in a recirculating manner through said valve with said reservoir when said valve is in a nonactuated position.

References Cited

UNITED STATES PATENTS

| | | | |
|---|---|---|---|
| 1,859,069 | 5/1932 | Beekman | 307—64 |
| 1,998,655 | 4/1935 | Byran | 290—30.6 |
| 2,920,211 | 1/1960 | Gotoh | 290—4 X |
| 3,050,635 | 8/1962 | Tanner | 290—4 X |
| 3,191,050 | 6/1965 | Park | 290—4 |
| 3,196,341 | 7/1965 | Geib | 290—4 X |

FOREIGN PATENTS 808,275  2/1959  Great Britain.

ORIS L. RADER, *Primary Examiner.*

G. SIMMONS, *Assistant Examiner.*